June 4, 1968          J. E. MAUREY          3,386,304
ADJUSTABLE MOTOR BASE
Filed March 7, 1966          2 Sheets-Sheet 1
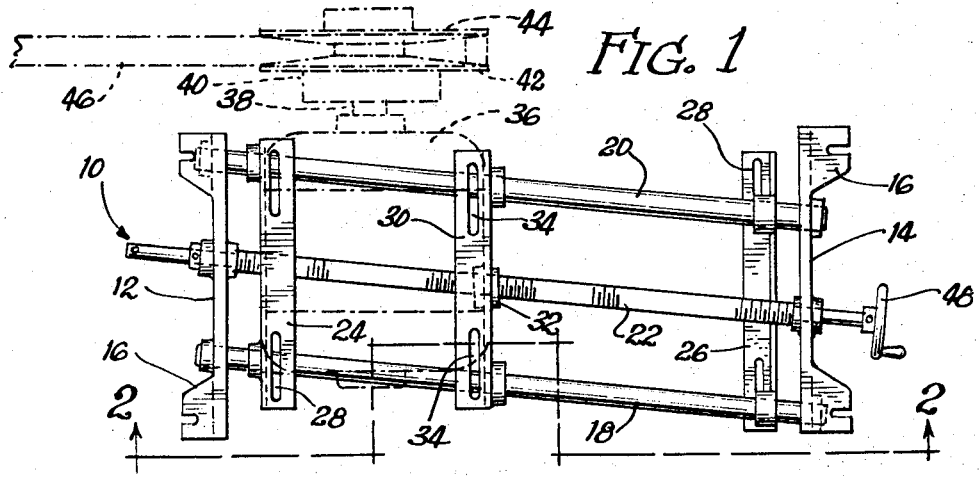
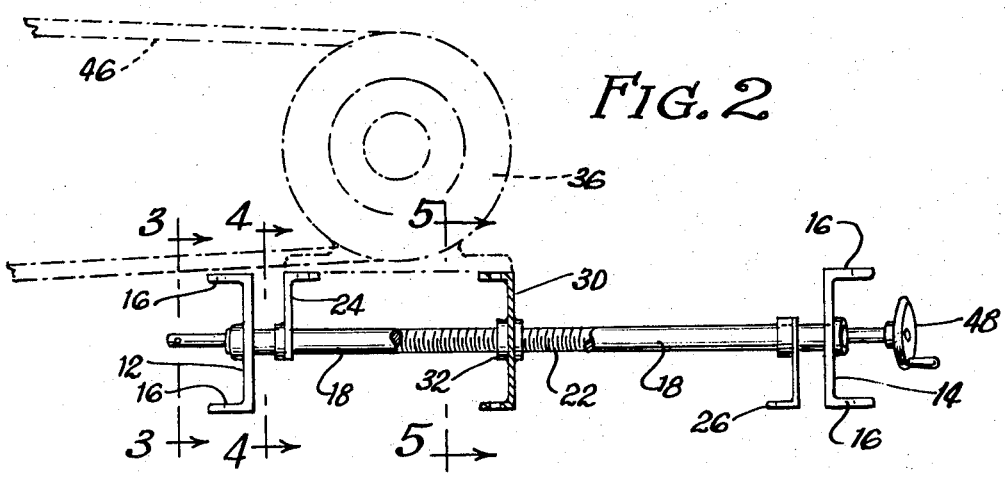
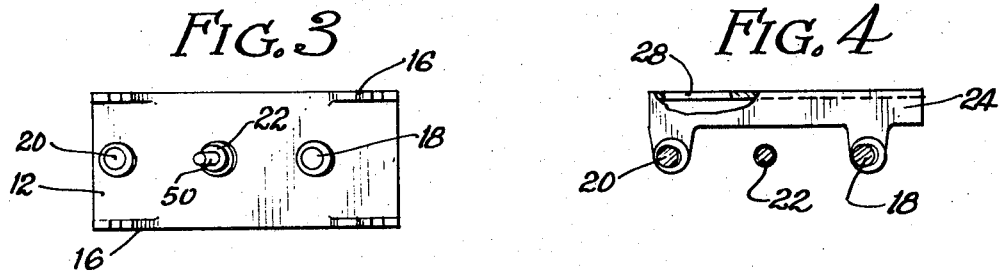
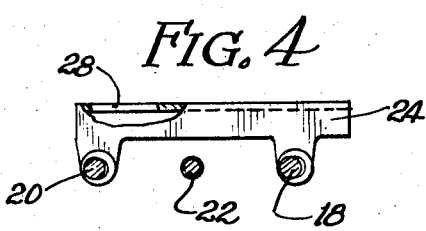
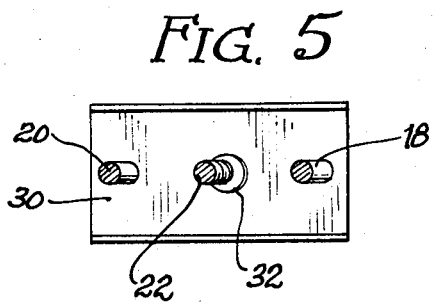
INVENTOR
Joseph E. Maurey
by McDougall, Hersh & Scott
Attys June 4, 1968 J. E. MAUREY 3,386,304
ADJUSTABLE MOTOR BASE Filed March 7, 1966 2 Sheets-Sheet 2

INVENTOR
Joseph E. Maurey
by McDougall, Hersh & Scott
Attys

United States Patent Office 3,386,304
Patented June 4, 1968

3,386,304
ADJUSTABLE MOTOR BASE
Joseph E. Maurey, Chicago, Ill., assignor to Maurey Manufacturing Corporation, Chicago, Ill., a corporation of Illinois
Filed Mar. 7, 1966, Ser. No. 532,322
6 Claims. (Cl. 74—424.8)

ABSTRACT OF THE DISCLOSURE

An adjustable motor base for carrying a motor provided with a variable speed sheave. The base is provided with at least three supports for attaching the motor to the base. At least one of the supports is driven by a drive screw while the other supports are movably mounted whereby the position of the motor and supports relative to the base can be shifted. The screw driven support extends on either side of the base while at least one of the movable supports extends on opposite sides of the base so that a motor can be mounted on either side. The screw and rods for mounting the support extend angularly relative to the direction of movement of the drive belt, and the drive screw can be driven from either end whereby left- or right-hand drive can be accomplished with the system.

---

This invention relates to a construction designed for the mounting of motors. In particular, the invention is concerned with a motor base which is to be employed for the mounting of motors which utilize a variable speed sheave or similar arrangement.

Variable speed sheave constructions are commonly used in applications which require drive belt or similar drive transmitting means and which are characterzed by means for adjusting the motor operation. Thus, the variable speed sheaves are adapted to be mounted on the drive shaft of a motor with a drive belt situated between the flanges of the sheave. The spacing between the sheave flanges is adapted to be varied whereby the position of the belt with respect to the sheave axis can be adjusted. A different driving speed is imparted by the belt when such adjustments are made even though the drive shaft of the motor is operating at a constant speed.

Operations of the type described can be accomplished by mounting the motor on a base which provides for changes in the motor position. Motor bases have been designed whereby hand wheels or the like can be operated whereby the motor will be moved from one position to another thereby changing the operating characteristics of the drive belt.

It is an object of this invention to provide an improved means for adjusting the position of a motor of the type employed in conjunction with variable speed sheaves.

It is a more particular object of this invention to provide an adjustable motor base for the mounting of motors carrying variable speed sheaves whereby the motor can be operated at maximum efficiency and wherein the base construction is characterized by ideal versatility whereby the construction can be utilized in a variety of systems.

It is an additional object of this invetnion to provide a mechanism of the type described which is characterized by a change of direction of travel to either side, this being accomplished simply by inverting the base and by changing the hand wheel to the opposite end of the mechanism whereby a single base can be used for either left- or right-hand drive.

These and other objects of this invention will appear hereinafter, and for purposes of illustration, but not of limitation, specific embodiments of this invention are shown in the accompanying drawings in which:

FIGURE 1 is a plan view of the adjustable motor base of this invention;

FIGURE 2 is a side elevation, partly in section, taken about the line 2—2 of FIGURE 1;

FIGURE 3 is an end view taken about the line 3—3 of FIGURE 2;

FIGURE 4 is a sectional view taken about the line 4—4 of FIGURE 2;

FIGURE 5 is a sectional view taken about the line 5—5 of FIGURE 2;

Figure 6:
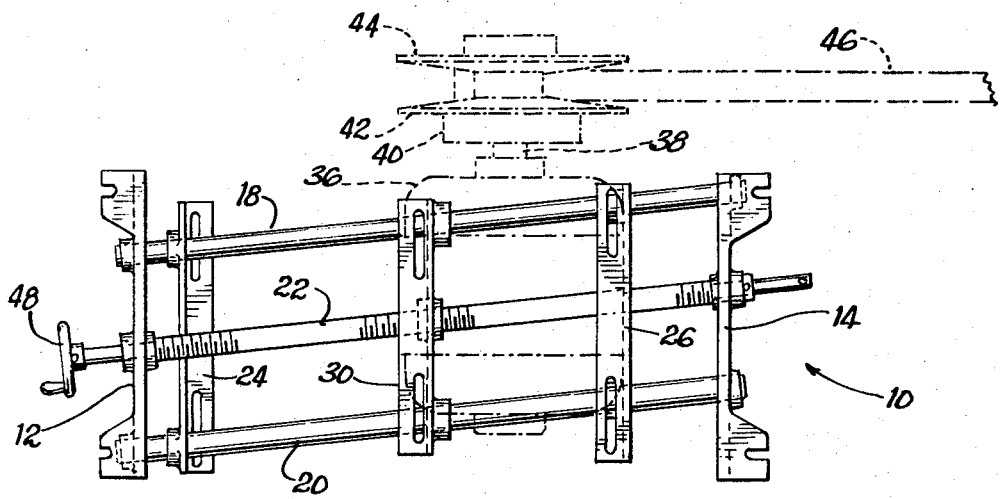
FIGURE 6 is a plan view of the motor base of FIGURE 1 situated in a different operating position; and, FIGURE 7 is a side elevation of the base as shown in FIGURE 6.

The adjustable motor base of this invention includes first and second support members which are adapted to receive a motor. The supports hold the motor in position for operations which include shifting of the motor with respect to the base whereby the drive belt carried by the variable speed sheave of the motor is adapted to be operated at variable speeds.

One of the support members is carried on a rotatable screw whereby the position of this support member can be adjusted by driving the support member through operation of the screw. At least two other support members are slideably mounted on rods extending across the motor base. When the motor is attached between the screw driven support member and one of these other support members, the entire combination will be moved through operation of the screw.

The slideably mounted motor supports each include motor mounting portions. The mounting portions of the respective slideable supports extend from opposite sides of the base. A pair of mounting portions are provided on the screw driven support, and these extend on opposite sides of the base. With this arrangement, either side of the motor base can be employed for mounting a motor.

The supporting rods and the drive screw are angularly disposed with respect to the motor base. The particular angle is calculated on the basis of the construction of conventional variable speed sheaves. As will be explained in detail hereinafter, this arrangement provides for proper alignment of the drive belt irrespective of the position to which the support members are moved. When the support members are designed in accordance with this invention to permit mounting of a motor on either side of the base, the construction can be employed with the drive shaft extending on either the right or left side of the base. This arrangement provides for a high degree of versatility in the construction.

The accompanying drawings illustrate in detail a preferred embodiment of the instant invention. The motor base 10 includes a pair of mounting brackets 12 and 14 whereby the base can be situated on a suitable mounting. It will be noted that each of these brackets includes flanges 16 located on either side of the motor base. This enables the motor base to be used in either of the positions illustrated in FIGURES 2 and 7.

A pair of rods 18 and 20 are secured at their ends in the brackets 12 and 14. A drive screw 22 is journalled in the respective brackets in a position intermediate the rods 18 and 20.

Motor supports 24 and 26 are slideably mounted at their ends on the rods 18 and 20. Each of these motor supports includes slots 28 whereby motors of different sizes can be accommodated.

A driven motor support 30 is also mounted at its ends on the rods 18 and 20. In addition, the support 30 includes a centrally located threaded bore 32 which receives the drive screw 22. Slots 34 are formed in the support 30 whereby motors of different sizes can also be mounted on this support.

When a motor 36 is mounted on the supports 24 and 30, the drive shaft 38 of this motor extends outwardly from one side of the motor base. A variable speed sheave 40 including a fixed flange 42 and a movable flange 44 is attached to the shaft 38. Drive belt 46 is operated through the sheave.

In the operation of the arrangement shown in FIGURE 1, the screw 22 is adapted to be rotated by means of the hand wheel 48. When the wheel is rotated, the support 30 will move, and the motor 36 along with the support 24 will move a corresponding amount. Assuming that the movement is from left to right, the belt 46 will be moved inwardly with respect to the axis 38, and this will cause the flange 44 to move outwardly with respect to the flange 42. The center line of the belt 46 will thus change with respect to the sheave; however, the movement effected by the rotation of wheel 48 also shifts the entire motor. As noted, the construction of the motor base is based on the sheave design, and the angular calculations are such that the change in center line will be accommodated by the shifting of the motor. Accordingly, the belt will maintain a proper alignment with respect to the means to which it is connected.

Figure 7:
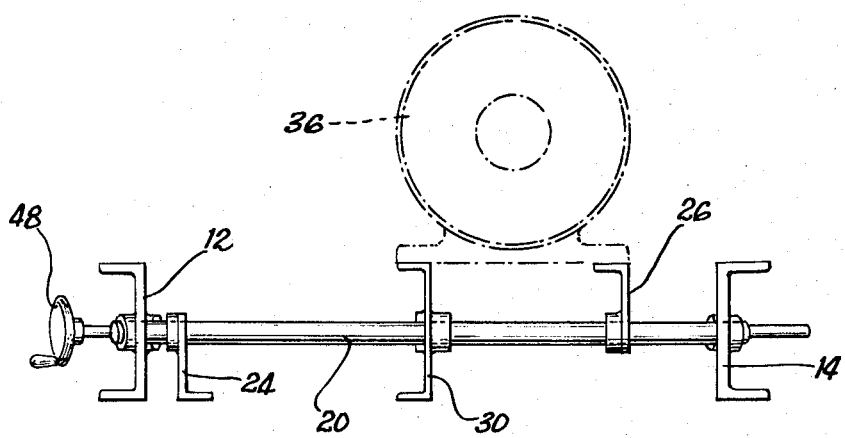

FIGURES 6 and 7 illustrate the mounting arrangement as it appears with the motor 36 located on the opposite side of the motor base 10. Thus, the base is inverted, and in this case shaft 38 extends from the opposite side of the base with the belt 46 extending in the opposite direction from the direction shown in FIGURE 1. The screw driven support 30 is utilized in combination with the support 26 in this instance. It will also be noted that the hand wheel 48 has been moved to the opposite end of the motor base. The hand wheel is designed to be received in bore 50 (FIGURE 3) located at either end of the drive screw 22. A suitable key construction can be utilized whereby the hand wheel will lock onto the drive screw.

In the arrangement shown in FIGURE 6, the belt is at its extreme inner position with respect to the sheave. Obviously, the proper alignment of the belt will be maintained in all positions when the supports are moved from left to right.

The motor base construction described has certain clear advantages which result from its novel design. The structure combines the advantageous features of an angular arrangement with versatility since proper belt alignment can be achieved with the motor mounted for operation in either direction. The removable hand wheel comprises an important feature since this permits adjustment without requiring a workman to stand at the end of the construction from which the drive belt extends. All of these advantages are achieved in a construction which has a minimum of movable parts, which can be manufactured on a highly efficient basis, and which is uncomplicated in its operation.

It will be understood that various changes and modifications may be made in the construction described which provide the characteristics of this invention without departing from the spirit thereof particularly as defined in the following claims.

That which is claimed is:

1. In an adjustable motor base for use in conjunction with a motor provided with a variable speed sheave, said base comprising a plurality of motor supports and mounting means therefor, said supports being movable relative to said mounting means and including means for driving at least one of the supports relative to said base, said mounting means being disposed at an angle with respect to said supports whereby movement of said supports will shift a motor carried on the supports sidewise with respect to said base, said motor and the supports carrying the motor being movable in response to the action of said driving means, the improvement wherein each of said supports define means for connecting a motor thereto, said motor connecting means on said one support being located on both sides of said base, and wherein said supports include at least two additional supports, each of which is movable relative to said mounting means, one of said additional supports having motor connecting means located at least on one side of said base, and the other of said supports having motor connecting means located at least on the opposite side of said base whereby said base can be used in either of two inverted positions, and wherein said driving means is operable from either end of said base.

2. A motor base in accordance with claim 1 wherein said driving means comprises a drive screw, a removable hand wheel for rotating said screw, and means for connecting said hand wheel at opposite ends of said screw to provide for operation from either end.

3. A motor base in accordance with claim 2 including end plates comprising brackets for securing said base in place, said mounting means for said supports including a pair of rods connected at either end to said plates, said supports including openings receiving said rods for slideable movement of the supports with respect to the rods.

4. A motor base in accordance with claim 3 wherein said one support includes an additional threaded opening for receiving said drive screw, said drive screw being journalled at its opposite ends in said plates, the ends of said drive screw extending through said plates for receiving said hand wheel.

5. A motor base in accordance with claim 4 wherein said one support includes horizontally disposed flanges defining slots for attachment of a motor thereto.

6. A motor base in accordance with claim 5 wherein each of said additional supports includes a single horizontally disposed flange defining slots for attachment of a motor thereto, said flanges forming said motor connecting means.

References Cited

UNITED STATES PATENTS

| | | | |
|---|---|---|---|
| 894,808 | 8/1908 | Bleser | 74—424.8 |
| 1,878,983 | 9/1932 | Harris. | |
| 1,984,507 | 12/1934 | Waner | 74—230.17 |
| 2,189,295 | 2/1940 | Pfleger | 74—230.17 |
| 2,202,553 | 5/1940 | Heyer | 74—230.17 |
| 2,398,520 | 4/1946 | Clements | 74—230.17 X |

DONLEY J. STOCKING, *Primary Examiner.*

LEONARD H. GERIN, *Examiner.*